US012592607B2

(12) United States Patent
Zhao et al.

(10) Patent No.: US 12,592,607 B2
(45) Date of Patent: Mar. 31, 2026

(54) LIQUID-COOLED MOTOR FOR BSG AND MOTOR HOUSING AND COOLING STRUCTURE THEREOF

(71) Applicant: Prestolite Electric (Weifang) Limited, Weifang (CN)

(72) Inventors: Ruirui Zhao, Weifang (CN); Dahu Dong, Weifang (CN); Jian Cao, Weifang (CN)

(73) Assignee: Prestolite Electric (Weifang) Limited, Weifang (CN)

( * ) Notice: Subject to any disclaimer, the term of this patent is extended or adjusted under 35 U.S.C. 154(b) by 0 days.

(21) Appl. No.: 19/107,963

(22) PCT Filed: Jun. 30, 2023

(86) PCT No.: PCT/CN2023/105093

§ 371 (c)(1),
(2) Date: Feb. 28, 2025

(87) PCT Pub. No.: WO2025/000504

PCT Pub. Date: Jan. 2, 2025

(65) Prior Publication Data

US 2026/0005573 A1 Jan. 1, 2026

(51) Int. Cl.
*H02K 5/20* (2006.01)
*H02K 9/19* (2006.01)
*H02K 11/33* (2016.01)

(52) U.S. Cl.
CPC .............. *H02K 5/203* (2021.01); *H02K 9/19* (2013.01); *H02K 11/33* (2016.01)

(58) Field of Classification Search
CPC ........... H02K 5/203; H02K 9/19; H02K 11/33
USPC .......................................................... 310/54
See application file for complete search history.

(56) References Cited

U.S. PATENT DOCUMENTS

2021/0257883 A1 8/2021 Kim et al.

FOREIGN PATENT DOCUMENTS

CN        106911224 A     6/2017
CN        209692488 U    11/2019
CN        114598107 A     6/2020
CN        111654162 A     9/2020
CN        214255976 U     9/2021
JP        2006197781 A     7/2006
KR    10-2020-0142292 A    12/2022

*Primary Examiner* — Terrance L Kenerly
*Assistant Examiner* — Theodore L Perkins
(74) *Attorney, Agent, or Firm* — MUNCY, GEISSLER, OLDS & LOWE, P.C.

(57) ABSTRACT

The liquid-cooled motor for BSG includes a motor housing, which has a cooling structure. A cooling structure includes: an outer water jacket; an inner water jacket fitted into the outer water jacket; a first cooling water passage disposed on the inner water jacket; a second cooling water passage disposed on an inverter; a first transfer water passage and a second transfer water passage both disposed on the outer water jacket and a rear end cover. Cooling water enters into the first cooling water passage and the first transfer water passage synchronously from a transfer water inlet, and enters into the second cooling water passage through the first transfer water passage, thereby realizing simultaneous cooling and heat dissipation of a stator, a rotor and the inverter of the liquid-cooled motor for BSG, respectively.

11 Claims, 4 Drawing Sheets

Contour plot of the maximum inlet pressure/Pa, temperature of the stator
of the complete machine/°C and temperature of the inverter/°C

LIQUID-COOLED MOTOR FOR BSG AND MOTOR HOUSING AND COOLING STRUCTURE THEREOF

BACKGROUND OF THE INVENTION

1. Field of the Invention

The invention relates to a liquid-cooled motor for BSG, and particularly to a liquid-cooled motor for BSG and a motor housing and a cooling structure thereof.

2. Related Art

Belt-driven Starter Generator (BSG) belongs to mild hybrid technique in hybrid power and is a motor system integrating an inverter controller with a motor that may enable quick start-stop of the motor when the vehicle is idling and recover energy when the vehicle brakes. Currently, the 48V BSG system has been applied in a part of passenger vehicles and is mounted at a front gear train of the engine, causing a small mounting space and a high temperature, and seriously affecting performance and efficiency of the motor. The existing motors for BSG often uses a liquid-cooled system for cooling, and mainly includes a motor water circuit for cooling a stator, and a rotor and a controller water circuit for cooling the controller, and in order to reduce the volume of the motor and save production cost, the prior art serially integrates water passages of the complete machine and the inverter into a motor housing. For example, the series connection method of the water circuits of the two parts of the motor and the inverter is that a water inlet of the inverter water passage is connected to a water inlet pipe, a water inlet of the complete machine water passage is connected to a water outlet of the inverter, and a water outlet of the complete machine water passage is connected to a drain pipe. Since the front end cover or the rear end cover of the motor is integrated with the water passages, the inner and outer walls of the housing are thick, and the housing is heavy and difficult to manufacture. It is only possible to manufacture series-connected water passages with large flow resistance and low heat dissipation efficiency, resulting in high requirement for the pressure of the complete vehicle water circuit, and it is not convenient to be applied to working conditions of low-pressure water circuits.

SUMMARY OF THE INVENTION

The technical problem to be solved by the invention is to provide a liquid-cooled motor for BSG and a motor housing and a cooling structure thereof with respect to deficiencies of not convenient to be applied to working conditions of external low-pressure water circuits, low heat dissipation efficiency using the series-connected water circuits, thick inner and outer walls of the housing, heavy weight of the housing and large difficulty in manufacturing the housing, and the like.

To achieve the objects, the invention provides a cooling structure of a liquid-cooled motor for BSG, comprising:

an outer water jacket disposed between a front end cover and a rear end cover of the liquid-cooled motor for BSG, two ends of the outer water jacket are connected to the front end cover and the rear end cover, respectively;

an inner water jacket fitted into the outer water jacket, one end of the inner water jacket is abutting against the front end cover, and the other end of the inner water jacket is connected to one end of the outer water jacket which is close to the rear end cover;

a first cooling water passage disposed on the inner water jacket, and a water outlet and a water inlet of the first cooling water passage both disposed on the outer water jacket, and in communication with a cooling water circuit of the liquid-cooled motor for BSG, respectively;

a second cooling water passage disposed on an inverter of the liquid-cooled motor for BSG;

a first transfer water passage disposed on the outer water jacket and the rear end cover, water inlets of the first cooling water passage and the second cooling water passage both connected to the first transfer water passage, and a transfer water inlet disposed on the first transfer water passage corresponding to the water inlet of the first cooling water passage, and in communication with the cooling water circuit of the liquid-cooled motor for BSG; and a second transfer water passage disposed on the outer water jacket and the rear end cover, the water inlet of the second cooling water passage is in communication with the water inlet of the first cooling water passage through the first transfer water passage, and a water outlet of the second cooling water passage is in communication with the water outlet of the first cooling water passage through the second transfer water passage;

wherein cooling water enters into the first cooling water passage and the first transfer water passage synchronously from the transfer water inlet, and enters into the second cooling water passage through the first transfer water passage, thereby realizing simultaneous cooling and heat dissipation of a stator, a rotor and the inverter of the liquid-cooled motor for BSG, respectively.

In the cooling structure of the liquid-cooled motor for BSG, an upper end face of the outer water jacket abuts against the rear end cover, an outer rabbet is disposed at an inner side of the upper end face of the outer water jacket, and abuts against an end face of the stator of the liquid-cooled motor for BSG, and a first gap is provided at a connection of a lower end face of the outer water jacket and the front end cover.

In the cooling structure of the liquid-cooled motor for BSG, an inner rabbet is disposed at an inner side of a lower end face of the inner water jacket, and abuts against the end face of the stator, and an outer circumferential surface of the stator and an inner wall of the inner water jacket are in interference fit; the lower end face of the inner water jacket abuts against the front end cover, and a second gap is provided at a connection of an upper end face of the inner water jacket and the outer water jacket.

In the cooling structure of the liquid-cooled motor for BSG, the first gap and the second gap are both 0.1 mm to 1 mm.

In the cooling structure of the liquid-cooled motor for BSG, the first cooling water passage is spirally and convolutedly arranged along an outer wall of the inner water jacket, and the water outlet is disposed at an end of the first cooling water passage.

In the cooling structure of the liquid-cooled motor for BSG, the second cooling water passage is a U-shaped water passage, and is disposed on a water plate of the inverter, the cooling water flows into the second transfer water passage from the water outlet of the second cooling water passage, and the cooling water from a water outlet of the second transfer water passage and from the first cooling water passage flows out of the water outlet of the first cooling water passage after convergence.

In the cooling structure of the liquid-cooled motor for BSG, the U-shaped water passage is provided with a plurality of spoiler heat dissipation columns.

In the cooling structure of the liquid-cooled motor for BSG, the first transfer water passage is further provided with a drain outlet disposed under the transfer water inlet, and in communication with the cooling water circuit of the liquid-cooled motor for BSG; when the drain outlet is open, and the cooling water directly enters into the drain outlet from the transfer water inlet to avoid entering into the liquid-cooled motor for BSG for cooling.

In the cooling structure of the liquid-cooled motor for BSG, the first transfer water passage is disposed on the outer water jacket and the rear end cover and is misaligned to avoid a mounting hole; the second transfer water passage is disposed on the outer water jacket and the rear end cover and is misaligned to avoid the mounting hole.

To better achieve the above objects, the invention further provides a motor housing of a liquid-cooled motor for BSG, comprising a front end cover, a rear end cover, and a cooling structure, wherein the cooling structure is the cooling structure as described above.

To better achieve the above objects, the invention further provides a liquid-cooled motor for BSG, comprising a motor housing, a stator mounted within the motor housing, a rotor mounted and supported on the motor housing corresponding to the stator, and an inverter connected to the motor housing, wherein the motor housing is the motor housing as described above.

Hereinafter the invention is described in detail combining with the accompanying drawings and the specific embodiments, but the invention is not limited thereto.

Figure 1:
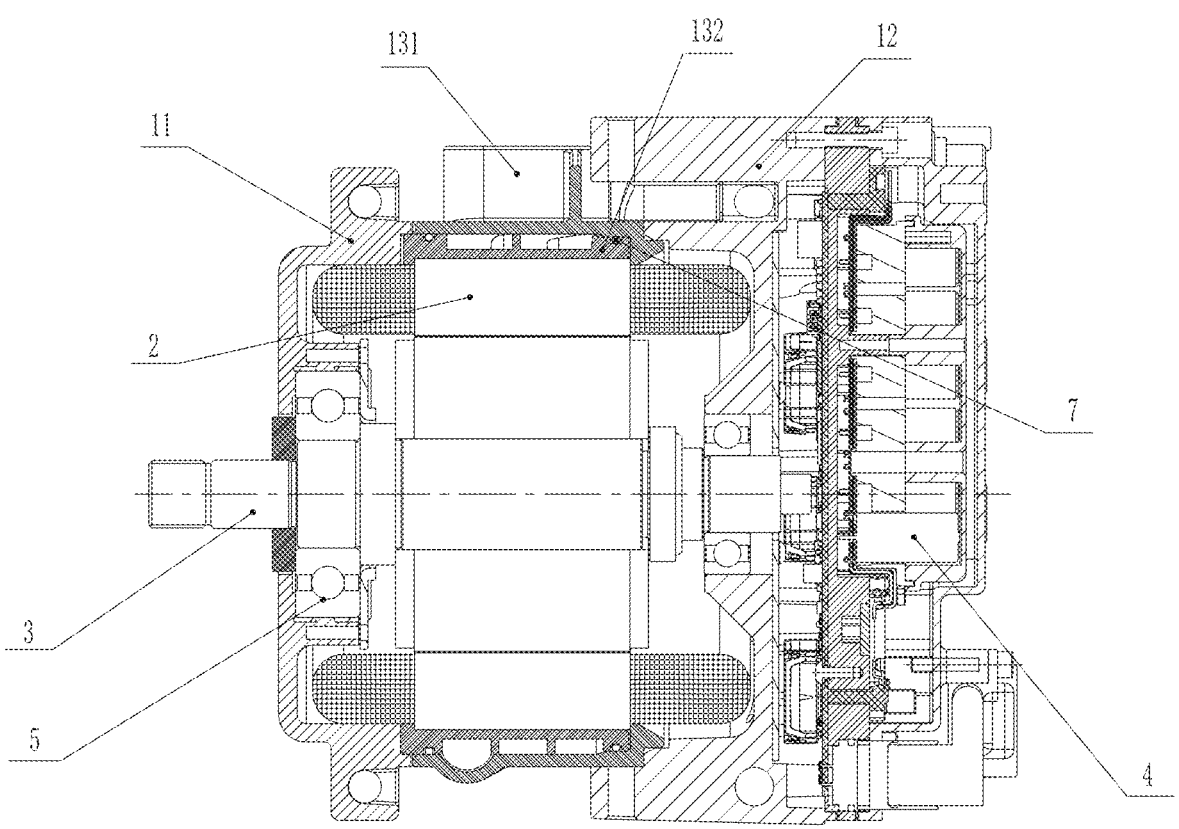
FIG. 1 is a structural diagram of a liquid-cooled motor for BSG in one embodiment of the invention.

Wherein, reference numerals:

1 motor housing
11 front end cover
12 rear end cover
121 mounting hole
13 cooling structure
131 outer water jacket
1311 outer rabbet
132 inner water jacket
1321 inner rabbet
133 first cooling water passage
1331 water outlet
134 second cooling water passage
135 first transfer water passage 1351 transfer water inlet
1352 drain outlet
136 second transfer water passage
137 base plate of water plate
138 cover plate of water plate
139 spoiler heat dissipation columns
2 stator
3 rotator
4 inverter
5 bearing
6 through bolt
7 sealing ring

PREFERABLE EMBODIMENTS OF THE INVENTION

Hereinafter the structure principle and the working principle of the invention are described in detail combining with the accompanying drawings:

Referring to FIG. 1, FIG. 1 is a structural diagram of a liquid-cooled motor for BSG in one embodiment of the invention. The liquid-cooled motor for BSG of the invention comprises a motor housing 1, a stator 2 mounted within the motor housing 1, a rotor 3 mounted and supported on the motor housing 1 corresponding to the stator 2, and an inverter 4 connected to the motor housing 1. Since the composition, structure, mutual positional relationship, connection relationship and function of other components of the motor are all mature prior arts, the details are not described here. Hereinafter the motor housing 1 and a cooling structure 13 of the invention are explained in detail.

Figure 2:
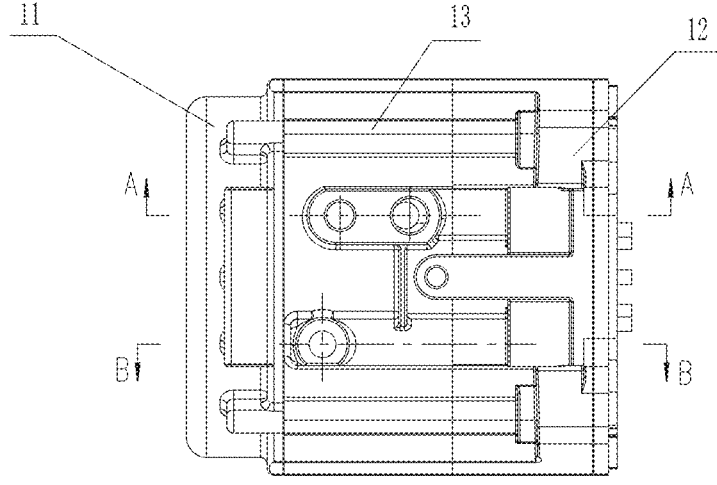
FIG. 2 is a structural diagram of a motor housing in one embodiment of the invention.

Referring to FIG. 2, FIG. 2 is a structural diagram of the motor housing 1 in one embodiment of the invention. The motor housing 1 of the invention comprises a front end cover 11, a rear end cover 12 and the cooling structure 13, and the rotor 3 is mounted on the front end cover 11 and the rear end cover 12 through a bearing 5. A through bolt 6 passes through the rear end cover 12, an outer water jacket 131 and the front end cover 11 to fix an inner water jacket 132, the outer water jacket 131 and the stator 2 between the front end cover 11 and the rear end cover 12.

Figure 3:
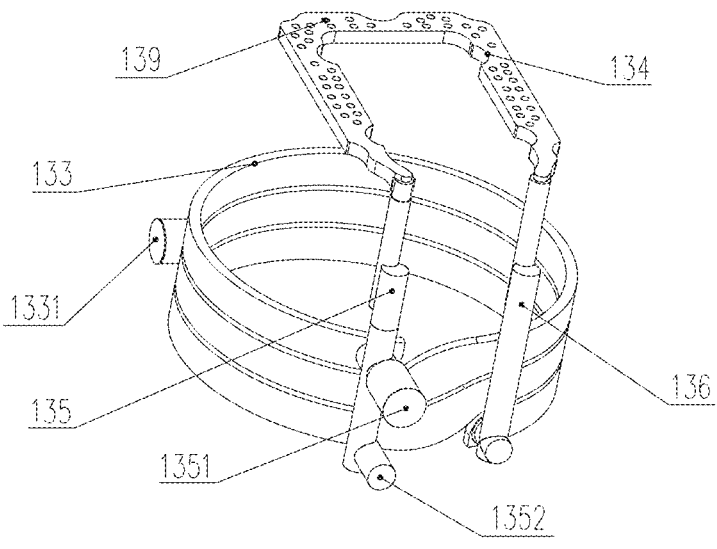
FIG. 3 is a schematic diagram of a cooling structure in one embodiment of the invention.
Figure 4:
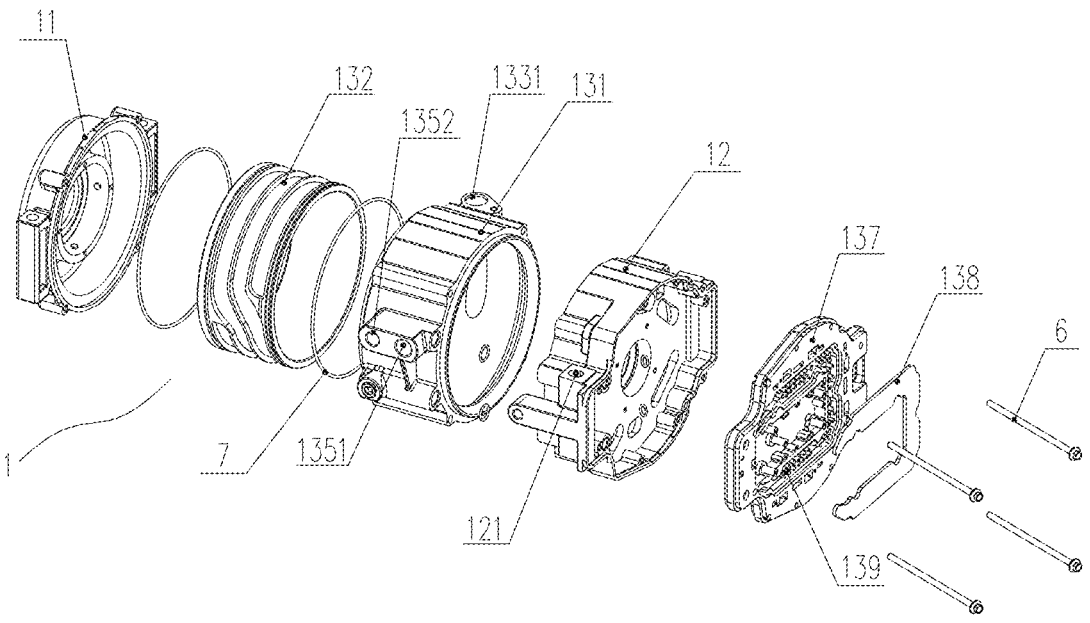
FIG. 4 is an exploded diagram of a motor housing in one embodiment of the invention.
Figure 5:
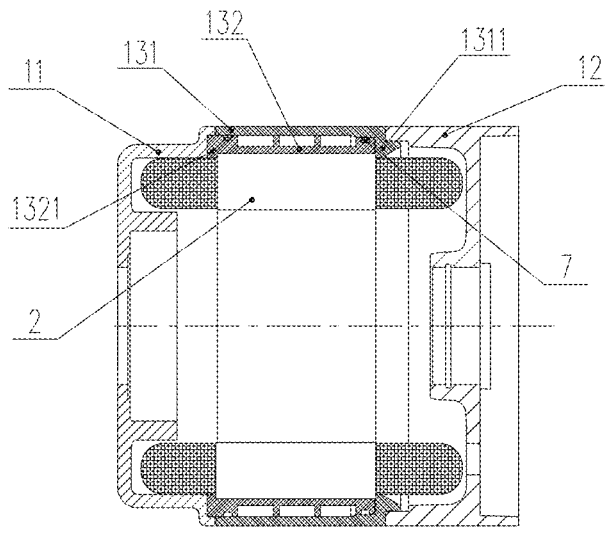
FIG. 5 is an assembly diagram of a motor housing in one embodiment of the invention.

Referring to FIGS. 3 to 5, FIG. 3 is a schematic diagram of the cooling structure 13 in one embodiment of the invention, and FIG. 4 is an exploded diagram of the motor housing 1 in one embodiment of the invention. The cooling structure 13 of the invention comprises: the outer water jacket 131 disposed between the front end cover 11 and the rear end cover 12 of the liquid-cooled 1 motor for BSG, one end of the outer water jacket 131 is connected to the front end cover 11, and the other end of the outer water jacket 131 is abutting against the rear end cover; the inner water jacket 132 fitted into the outer water jacket 131, one end of the inner water jacket 132 is abutting against the front end cover 11, and the other end of the inner water jacket 132 is connected to the outer water jacket 131; a first cooling water passage 133 disposed on the inner water jacket 132, a water outlet 1331 and a water inlet of the first cooling water passage 133 are both disposed on the outer water jacket 131, the water outlet 1331 is in communication with a cooling water circuit of the liquid-cooled motor for BSG, the first cooling water passage 133 is formed by fitting the inner water jacket 132 and the outer water jacket 131, and the inner water jacket 132 and the outer water jacket 131 are provided with grooves at both ends of the first cooling water passage 133 to place O-shaped sealing rings 7; a second cooling water passage 134 disposed on the inverter 4 of the liquid-cooled motor for BSG; a first transfer water passage 135 disposed on the outer water jacket 131 and the rear end cover 12, and is preferably misaligned to avoid a mounting hole 121, water inlets of the first cooling water passage 133 and the second cooling water passage 134 are both connected to the first transfer water passage 135, and a transfer water inlet 1351 is disposed on the first transfer water passage 135 corresponding to the water inlet of the first cooling water passage 133, and is in communication with the cooling water circuit of the liquid-cooled motor for BSG; and a second transfer water passage 136 disposed on the outer water jacket 131 and the rear end cover 12, and is preferably misaligned to avoid the mounting hole 121, one end of the second transfer water passage 136 is in communication with the first cooling water passage 133, the other end of the second transfer water passage 136 is in communication with a water outlet of the second cooling water passage 134, i.e. the water inlet of the second cooling water passage 134 is in communication with the water inlet of the first cooling water passage 133 through the first transfer water passage 135, and the water outlet of the second cooling water passage 134 is in communication with the water outlet 1331 of the first cooling water passage 133 through the second transfer water passage 136, so as to realize the parallel connection of the first cooling water passage 133 and the second cooling water passage 134; wherein a cooling water enters into the first cooling water passage 133 and the first transfer water passage 135 synchronously from the transfer water inlet 1351, and enters into the second cooling water passage 134 through the first transfer water passage 135, thereby realizing simultaneous cooling and heat dissipation of the stator 2, the rotor 3 and the inverter 4 of the liquid-cooled motor for BSG, respectively.

Figure 6:
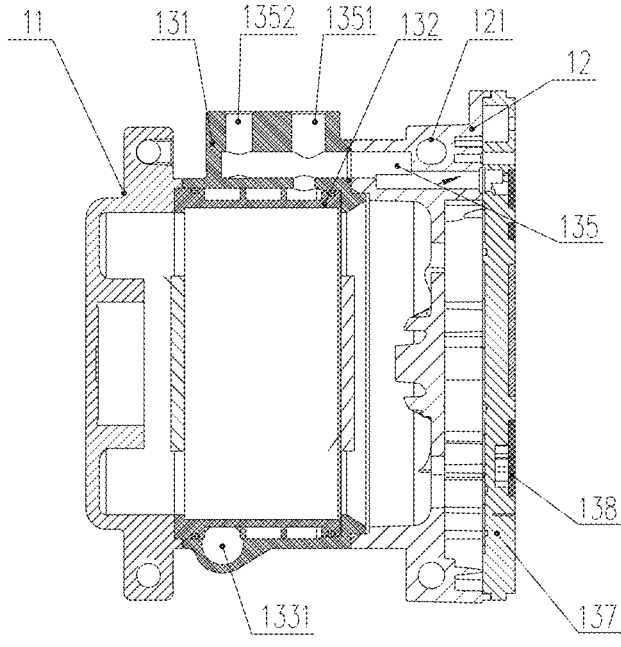
FIG. 6 is a sectional view along A-A of FIG. 2.
Figure 7:
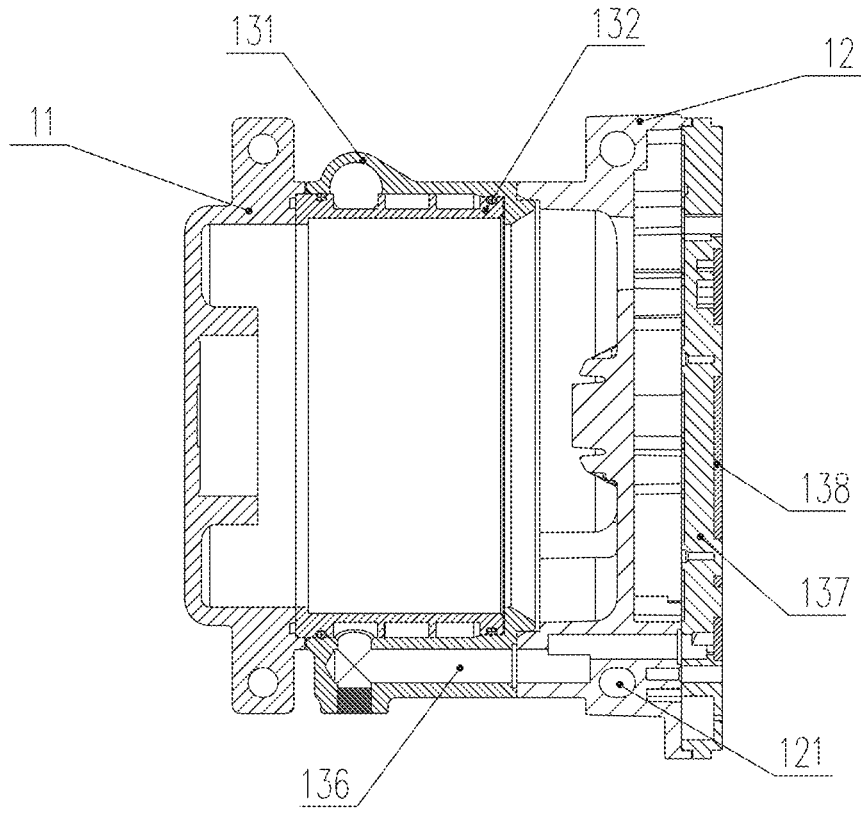
FIG. 7 is a sectional view along B-B of FIG. 2.

Referring to FIGS. 5 to 7, FIG. 5 is an assembly diagram of the motor housing 1 in one embodiment of the invention, FIG. 6 is a sectional view along A-A of FIG. 2, and FIG. 7 is a sectional view along B-B of FIG. 2. In this embodiment, an upper end face of the outer water jacket 131 abuts against the rear end cover 12, an outer rabbet 1311 is disposed at an inner side of the upper end face, and abuts against an axial end face of the stator 2 of the liquid-cooled motor for BSG, and a first gap is provided at a connection of a lower end face of the outer water jacket 131 and the front end cover 11. An inner rabbet 1321 is disposed at an inner side of a lower end face of the inner water jacket 132, and abuts against the axial end face of the stator 2, an outer circumferential surface of the stator 2 and an inner wall of the inner water jacket 132 are in interference fit, the lower end face of the inner water jacket 132 abuts against the front end cover 11, and a second gap is provided at a connection of an upper end face of the inner water jacket 132 and the outer water jacket 131. The first gap and the second gap are both 0.1 mm to 1 mm.

Referring to FIG. 3, the first cooling water passage 133 in this embodiment is spirally and convolutedly arranged along an outer wall of the inner water jacket 132, the cross section of the first cooling water passage 133 is preferably rectangular, and the first cooling water passage 133 is preferably spiraling and convoluting for three turns, and the water outlet 1331 is disposed at an end of the first cooling water passage 133. The second cooling water passage 134 is a U-shaped water passage, and is disposed on a water plate of the inverter 4, the water plate of the inverter 4 includes a base plate of water plate 137 opened with a U-shaped flow passage groove where cylindrical spoiler heat dissipation members may be provided, and a cover plate of water plate 138; the cooling water flows into the second transfer water passage 136 from the water outlet of the second cooling water passage 134, and the cooling water from a water outlet of the second transfer water passage 136 and from the first cooling water passage 133 flows out of the water outlet 1331 of the first cooling water passage 133 after convergence. The first cooling water passage 133 and the second cooling water passage 134 are in parallel and are compact in structure. A plurality of spoiler heat dissipation columns 139 are provided within the U-shaped water passage according to the heat dissipation members, and the spoiler heat dissipation columns 139 are preferably spoiler heat dissipation cylinders with a diameter of 2.5 to 4 mm, and the diameter is preferably 2.5 mm, such that heat dissipation of the two cooling water passages may be balanced, heat dissipation efficiency is high, and low-pressure working conditions may be applied. Grooves are provided at a transfer end face of water passages of the rear end cover 12 and the outer water jacket 131 and provided at a transfer end face of water passages of the rear end cover 12 and the water plate of the inverter 4 to place O-shaped rings.

In this embodiment, the first transfer water passage 135 is further provided with a drain outlet 1352 disposed under the transfer water inlet 1351, and in communication with the cooling water circuit of the liquid-cooled motor for BSG; when the drain outlet 1352 is open, and the cooling water directly enters into the drain outlet 1352 from the transfer water inlet 1351 to avoid entering into the liquid-cooled motor for BSG for cooling.

When working, the drain outlet 1352 is blocked, the cooling water circuit supplies water to the transfer water inlet 1351, and the cooling water enters into the first cooling water passage 133 and the first transfer water passage 135 synchronously, and then enters into the second cooling water passage 134, thereby realizing simultaneous cooling and heat dissipation of the stator 2, the rotor 3 and the inverter 4, respectively. The cooling water entered into the first cooling water passage 133 spirally flows downward into the water outlet 1331 along the inner water jacket 132, the cooling water entered into the second cooling water passage 134 flows into the second transfer water passage 136 along the U-shaped water passage, and the cooling water from the water outlet of the second transfer water passage 136 and from the end of the first cooling water passage 133 flows out of the water outlet 1331 of the first cooling water passage 133 after convergence. Alternatively, the drain outlet 1352 is connected to the cooling water circuit and opened, the cooling water circuit supplies water to the transfer water inlet 1351, and cooling water directly enters into a water pipe connected to the drain outlet 1352 to avoid entering into the complete machine for cooling, such that the cooling water circuit of the liquid-cooled motor for BSG may be cut off without closing the water circuit of the complete machine while not affecting circulations of other water circuits of the system when the liquid-cooled 1 motor for BSG stops operation.

Figure 8:
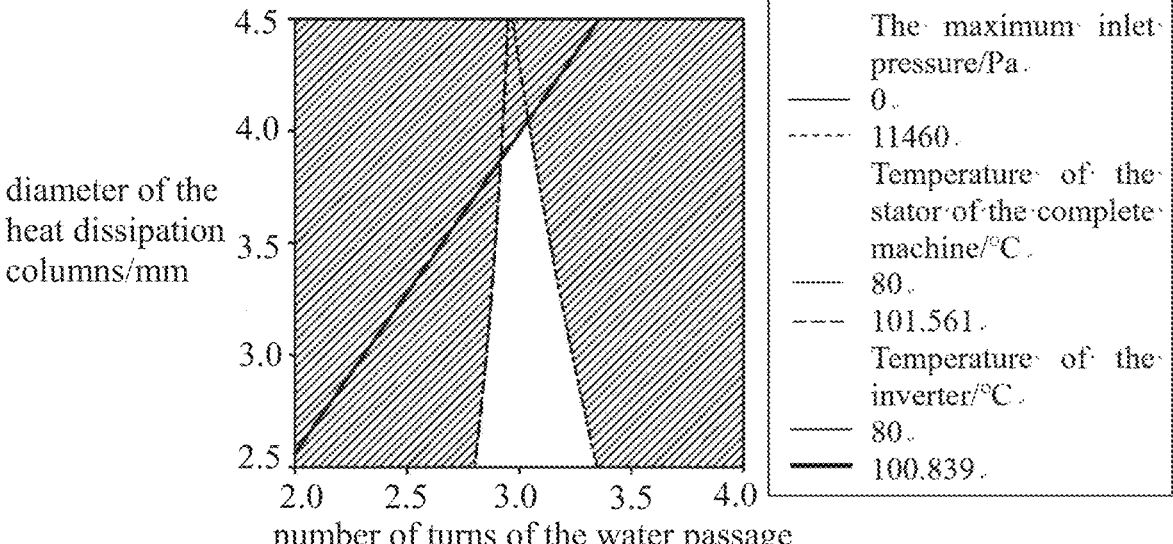
FIG. 8 is a contour plot of the inlet pressure, the temperature of a complete machine and the temperature of an inverter in one embodiment of the invention.

Referring to FIG. 8, FIG. 8 is a contour plot of the inlet pressure, the temperature of the complete machine and the temperature of the inverter in one embodiment of the invention. Simulation settings in this embodiment are as follows: an inlet flow rate is 0.2 kg/s, an inlet water temperature is 80° C., a winding loss of the stator 2 is 1024 W, an iron loss is 283 W, loss of each chip of the inverter 4 is 40 W, and the total power of a capacitor and a busbar is 70 W. Inlet pressures and temperatures of the complete machine and the inverter 4 under conditions of different number of turns of water passage and different diameters of heat dissipation columns are checked to evaluate the equilibrium of the flow in the parallel water passages and flow resistance of the water passages, and data results are shown in below table:

| Input | | | Output | |
|---|---|---|---|---|
| Number of turns of the first cooling water passage | Diameter of the spoiler heat dissipation cylinders of the second cooling water passage/mm | Inlet pressure/ MAX Pa | Temperature of the stator of the complete machine/° C. | Temperature of the inverter/ ° C. |
| 2 | 2.5 | 6837 | 108.45 | 101.68 |
| 2 | 3.5 | 7030 | 109.48 | 101.73 |
| 2 | 4.5 | 7293 | 111.98 | 104.22 |
| 3 | 2.5 | 10240 | 99.39 | 94.36 |
| 3 | 3.5 | 10830 | 101.00 | 100.84 |
| 3 | 4.5 | 11460 | 101.56 | 100.76 |
| 4 | 2.5 | 14550 | 99.75 | 97.15 |
| 4 | 3.5 | 15750 | 96.15 | 97.91 |
| 4 | 4.5 | 17560 | 95.81 | 98.25 |

Cooling effect of the first cooling water passage 133 is evaluated depending on the temperature of the stator of the complete machine, and cooling effect of the second cooling water passage 134 is evaluated depending on the temperature of the inverter 4, so as to select a preferable solution using the principle of selecting the water passage with a low pressure and high heat dissipation efficiency. The top 30% (30% of low pressure and 30% of low temperature) of data are selected to draw the contour plot. As can be known from the contour plot, a selection zone of the low pressure and the high heat dissipation efficiency is: water passage with three turns and spoiler heat dissipation cylinders with the diameter of 2.5 to 4 mm, and as can be known from the data table, when there are three turns of water passage, and the diameter of the spoiler heat dissipation cylinders is 2.5 mm, the flow resistance of the water circuit is the smallest, and the heat dissipation efficiency is the highest.

The first cooling water passage 133 (water passage of the complete machine) and the second cooling water passage 134 (water passage of the inverter) of the invention are connected in parallel, the water outlet 1331 and the water inlet of the first cooling water passage 133 are both disposed on the outer water jacket 131, the water inlet of the first cooling water passage 133 is connected to the transfer water inlet 1351, and the water outlet 1331 is connected to the external drain pipe, and the transfer water inlet 1351 is connected to a water pipe; the water inlet of the second cooling water passage 134 is connected to the water inlet of the first cooling water passage 133 through the first transfer water passage 135, the water outlet of the second cooling water passage 134 is connected to the water outlet 1331 of the first cooling water passage 133 through the second transfer water passage 136, so as to realize parallel connection of the first cooling water passage 133 and the second cooling water passage 134; the first transfer water passage 135 and the second transfer water passage 136 are both disposed on the rear end cover 12 and the outer water jacket 131, and are misaligned to avoid the mounting hole 121; the drain outlet 1352 in communication with the transfer water inlet 1351 is disposed under the transfer water inlet 1351; the protruding inner rabbet 1321 is disposed on the lower section of an inner end face of the inner water jacket 132, and an end face of the inner rabbet 1321 is in close contact with the stator 2, the lower end face of the inner water jacket 132 is in close contact with the rabbet of the front end cover 11, the first gap is provided between the upper end face of the inner water jacket 132 and the outer water jacket 131, and the first gap is preferably 0.1 to 1 mm; the protruding outer rabbet 1311 is disposed on the upper section of an inner end face of the outer water jacket 131, the upper end face of the outer water jacket 131 is in close contact with the rear end cover 12, the outer rabbet 1311 is in close contact with the stator 2, the second gap is provided between the lower end face of the outer water jacket 131 and the front end cover 11, and the second gap is preferably 0.1 to 1 mm; the axial end face of the stator 2 is in close contact with the inner rabbet 1321 of the inner water jacket 132 and the outer rabbet 1311 of the outer water jacket 131, the stator 2 and the inner wall of the inner water jacket 132 are interference fitted in the radial direction, and a magnitude of the interference is preferably 0 to 0.2 mm. The split-type housing of the motor may realize the production of the transfer water passage, and then the transfer water passage is connected to the first cooling water passage and the second cooling water passage, thereby realizing parallel connection of the first cooling water passage and the second cooling water passage.

Of course, the invention also may have various other embodiments, and without departing from concept and essence of the invention, those skilled in the art shall make various corresponding modifications and variations according to the invention, but these corresponding modifications and variations shall belong to the protection scope of the appended claims of the invention.

INDUSTRIAL APPLICABILITY

The invention uses parallel water passages to be applicable to low-pressure working conditions, such that the first cooling water passage and the second cooling water passage have balanced water flow and higher heat dissipation efficiency; and uses a split-type housing to facilitate the machining of the water passages of the motor to arrange water passages with high heat dissipation efficiency.

What is claimed is:

1. A cooling structure of a liquid-cooled motor for BSG, comprising:

an outer water jacket disposed between a front end cover and a rear end cover of the liquid-cooled motor for BSG, both ends of the outer water jacket are connected to the front end cover and the rear end cover, respectively;

an inner water jacket-fitted into the outer water jacket, one end of the inner water jacket is abutting against the front end cover, and the other end of the inner water jacket is connected to one end of the outer water jacket which is close to the rear end cover;

a first cooling water passage disposed on the inner water jacket, and a water outlet and a water inlet of the first cooling water passage are both disposed on the outer water jacket, and are in communication with a cooling water circuit of the liquid-cooled motor for BSG, respectively;

a second cooling water passage disposed on an inverter of the liquid-cooled motor for BSG;

a first transfer water passage disposed on the outer water jacket and the rear end cover, water inlets of the first cooling water passage and the second cooling water passage are both connected to the first transfer water passage, and a transfer water inlet is disposed on the first transfer water passage corresponding to the water inlet of the first cooling water passage, and is in communication with the cooling water circuit of the liquid-cooled motor for BSG; and a second transfer water passage disposed on the outer water jacket and the rear end cover, the water inlet of the second cooling water passage is in communication with the water inlet of the first cooling water passage through the first transfer water passage, and a water outlet of the second cooling water passage is in communication with the water outlet of the first cooling water passage through the second transfer water passage;

wherein a cooling water enters into the first cooling water passage and the first transfer water passage synchronously from the transfer water inlet, and enters into the second cooling water passage through the first transfer water passage, thereby realizing simultaneous cooling and heat dissipation of a stator, a rotor and the inverter of the liquid-cooled motor for BSG, respectively.

2. The cooling structure of the liquid-cooled motor for BSG according to claim 1, wherein an upper end face of the outer water jacket abuts against the rear end cover, an outer rabbet is disposed at an inner side of the upper end face of the outer water jacket, and abuts against an end face of the stator of the liquid-cooled motor for BSG, and a first gap is provided at a connection of a lower end face of the outer water jacket and the front end cover.

3. The cooling structure of the liquid-cooled motor for BSG according to claim 2, wherein an inner rabbet is disposed at an inner side of a lower end face of the inner water jacket, and abuts against the end face of the stator, and an outer circumferential surface of the stator and an inner wall of the inner water jacket are in interference fit; the lower end face of the inner water jacket abuts against the front end cover, and a second gap is provided at a connection of an upper end face of the inner water jacket and the outer water jacket.

4. The cooling structure of the liquid-cooled motor for BSG according to claim 3, wherein the first gap and the second gap are both 0.1 mm to 1 mm.

5. The cooling structure of the liquid-cooled motor for BSG according to claim 1, wherein the first cooling water passage is spirally and convoluted arranged along an outer wall of the inner water jacket, and the water outlet is disposed at an end of the first cooling water passage.

6. The cooling structure of the liquid-cooled motor for BSG according to claim 5, wherein the second cooling water passage is a U-shaped water passage, and is disposed on a water plate of the inverter, the cooling water flows into the second transfer water passage from the water outlet of the second cooling water passage, and the cooling water from a water outlet of the second transfer water passage and from the first cooling water passage flows out of the water outlet of the first cooling water passage after convergence.

7. The cooling structure of the liquid-cooled motor for BSG according to claim 6, wherein the U-shaped water passage is provided with a plurality of spoiler heat dissipation columns.

8. The cooling structure of the liquid-cooled motor for BSG according to claim 1, wherein the first transfer water passage is further provided with a drain outlet disposed under the transfer water inlet, and in communication with the cooling water circuit of the liquid-cooled motor for BSG; when the drain outlet is open, the cooling water directly enters into the drain outlet from the transfer water inlet to avoid entering into the liquid-cooled motor for BSG for cooling.

9. The cooling structure of the liquid-cooled motor for BSG according to claim 1, wherein the first transfer water passage is disposed on the outer water jacket and the rear end cover, and is misaligned to avoid a mounting hole; the second transfer water passage is disposed on the outer water jacket and the rear end cover, and is misaligned to avoid the mounting hole.

10. A motor housing of a liquid-cooled motor for BSG, comprising a front end cover, a rear end cover, and a cooling structure, wherein the cooling structure is the cooling structure according to claim 1.

11. A liquid-cooled motor for BSG, comprising a motor housing, a stator mounted within the motor housing, a rotor mounted and supported on the motor housing corresponding to the stator, and an inverter connected to the motor housing, wherein the motor housing is the motor housing according to claim 10.

* * * * *